(12) United States Patent
McElhinney et al.

(10) Patent No.: US 12,394,433 B1
(45) Date of Patent: Aug. 19, 2025

(54) JOINING COMPONENTS FROM WAFERS HAVING DIFFERENT PATTERN DENSITIES

(71) Applicant: Seagate Technology LLC, Fremont, CA (US)

(72) Inventors: Paula Frances McElhinney, Londonderry (GB); Brendan Lafferty, Donegal (IE); Marcus Benedict Mooney, Donegal (IE)

(73) Assignee: Seagate Technology LLC, Fremont, CA (US)

( * ) Notice: Subject to any disclaimer, the term of this patent is extended or adjusted under 35 U.S.C. 154(b) by 989 days.

(21) Appl. No.: 17/324,493

(22) Filed: May 19, 2021

Related U.S. Application Data

(60) Provisional application No. 63/030,364, filed on May 27, 2020.

(51) Int. Cl.
  *G11B 5/31* (2006.01)
  *G11B 5/00* (2006.01)

(52) U.S. Cl.
  CPC .... *G11B 5/3173* (2013.01); *G11B 2005/0021* (2013.01); *Y10T 29/49032* (2015.01)

(58) Field of Classification Search
  CPC ................ G11B 5/3173; G11B 5/3967; G11B 2005/0005; G11B 5/484; Y10T 29/49021; Y10T 29/49032
  USPC ..................... 29/603.07, 603.01, 603.06, 729
  See application file for complete search history.

(56) References Cited

U.S. PATENT DOCUMENTS

| | | |
|---|---|---|
| 8,501,536 B2 | 8/2013 | Mooney et al. |
| 8,889,485 B2 | 11/2014 | Bower |
| 9,899,329 B2 | 2/2018 | Bower |
| 10,069,029 B1 | 9/2018 | Olson et al. |
| 10,217,730 B2 | 2/2019 | Bower et al. |
| 11,251,139 B2 * | 2/2022 | Cok ..................... H01L 25/0652 |
| 11,482,979 B2 * | 10/2022 | Trindade .................. H03H 3/02 |

* cited by examiner

*Primary Examiner* — Thiem D Phan
(74) *Attorney, Agent, or Firm* — Mueting Raasch Group

(57) ABSTRACT

A first set of components (e.g., recording head components) is formed on a first wafer at a first pattern density. A second set of components is formed on a second wafer at a second pattern density that is less than half that of the first pattern density. The first and second sets of components are joined to form respective subassemblies (e.g., recording head subassemblies).

15 Claims, 6 Drawing Sheets

JOINING COMPONENTS FROM WAFERS HAVING DIFFERENT PATTERN DENSITIES

RELATED APPLICATIONS

This application claims the benefit of Provisional Patent Application No. 63/030,364 filed on May 27, 2020, which is incorporated herein by reference in its entirety.

SUMMARY

The present disclosure is related to joining components from wafers having different pattern densities. In one embodiment, a first set of recording head components is formed on a first wafer at a first pattern density. A second set of recording head components is formed on a second wafer at a second pattern density that is less than half that of the first pattern density. The first and second sets of recording head components are joined to form respective recording head subassemblies.

In another embodiment, a first set of recording head components is formed on a first wafer at a first pattern density and a first part-to-part separation. A second set of recording head components is formed on a second wafer at a second pattern density that is less than half that of the first pattern density and a second part-to-part separation that is greater than the first part-to-part separation. A subset of the first set of recording head components is transfer printed at the second part-to-part separation to the second wafer. The subset of the first set of recording head components is joined to the second set of recording head components to form respective recording head subassemblies.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

Figure 1:
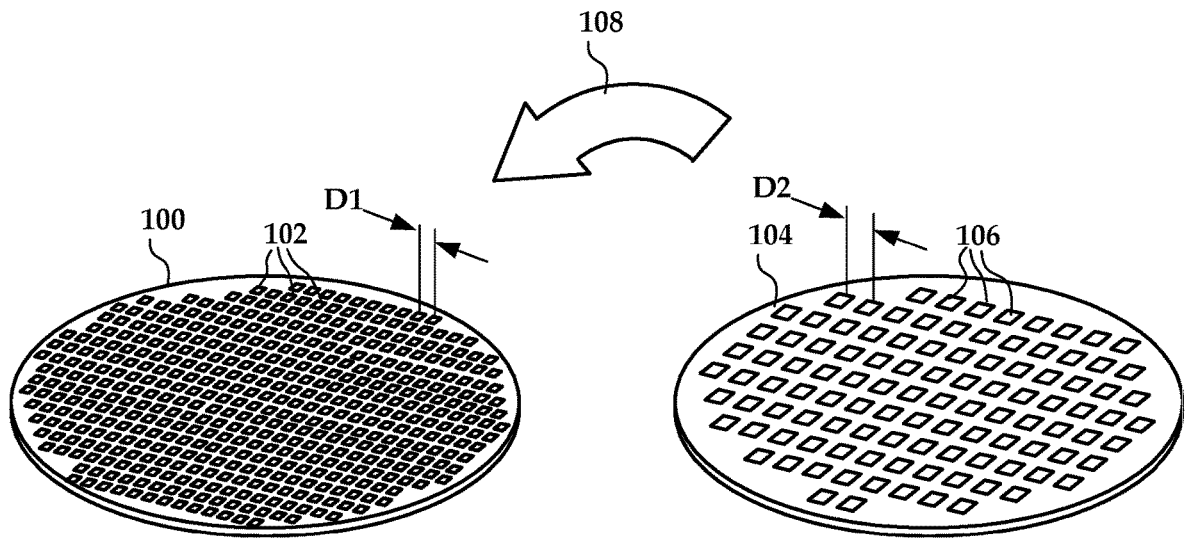
FIGS. 1 and 2 are diagrams showing a manufacturing process according to an example embodiment.

In the following description, reference is made to the accompanying set of drawings that form a part of the description hereof and in which are shown by way of illustration of several specific embodiments. It is to be understood that other embodiments are contemplated and may be made without departing from the scope of the present invention. The following detailed description, therefore, is not to be taken in a limiting sense.

This disclosure relates to manufacturing processes utilizing forming components on wafers and similar substrates. Generally, these processes involve depositing of material onto a substrate via sputtering, atomic layer deposition, etc. The deposited materials are shaped into patterns via photolithography, etching, planarization, etc. This process is repeated for many layers until a solid state device has been formed. These wafer manufacturing processes were originally developed for forming integrated electronics devices, for example, but have been also used for forming other types of devices, such as photonics and mechanical devices (e.g., micro-electromechanical systems or MEMS).

The ability to create smaller and smaller devices using wafer fabrication processes has been a driving force in growth of the electronics industry since the 1960's, when a postulate (now known as "Moore's Law") predicted the number of individual components (e.g., transistors) that can be packed into a given unit of space will double about every two years. This observation has been reasonably predictive of the improvement in wafer manufacturing processes over the last 60 years or so. Generally, there has been an exponential increase over time in the number of components per unit area that can be formed a wafer. This increase has been possible largely because of improvements in wafer fabrication processes.

While forming more components into a single wafer can reduce costs of individual components on the wafer and/or allow more complex devices to be made in the same unit area, the costs per wafer may increase with each new generation of manufacturing processes. This may be due not only to the number of individual steps needed for form the wafer, but also due to the costs in implementing the leading-edge technologies used in next generation fabrication facilities.

In the present disclosure, processes and systems are described for forming hard disk drive (HDD) components such as read/write heads, although the described processes may be applicable to any integrated electronics and/or integrated photonics devices. Generally, a hard drive read/write head includes micrometer scale magnetic transducers that can apply magnetic fields to a media during recording and read magnetic field changes during reading. For example, a write transducer may include an electrically driven coil that generates a magnetic field and a magnetic structure (e.g., yoke, pole) that directs the field towards the recording medium. In another example, a read transducer may include a stack of materials that exhibit magnetoresistance, such that the stack changes resistance in response to changes in magnetic fields. Note that read/write heads may be equivalently referred to herein as recording heads, write heads, read heads, heads, sliders, etc.

While the physical form factor of hard disk drives may have remained relatively unchanged over the last few decades, the complexity of the read/write heads is expected to increase even if the size of the heads has not significantly changed. For example, drives may employ additional devices to increase areal density when recording, such as heat-assisted magnetic recording (HAMR) and microwave-assisted magnetic recording (MAMR). These technologies use additional components (e.g., laser and optical devices for HAMR and spin-torque oscillator for MAMR) that can increase the complexity of the read/write head. In other examples, some drives may use multiple read transducers and/or write transducers, either with or without assisted recording devices as noted above. This can facilitate technologies such as two-dimensional magnetic recording (TDMR). In other cases, some drives may employ more than one read/write head per platter, such as drives using multiple actuators. In such a case, the read/write heads become a proportionally larger part of the cost of the drive assembly compared to conventional drives with one head per disk surface.

While storage technologies such as flash memory have supplanted HDD storage in some applications, there are still many applications where the low cost per unit data of HDD storage makes this a preferred option. In order to maintain this cost advantage, it is desired to reduce the costs of manufacturing the read/write heads. The head components are made using wafer production techniques (e.g., layer deposition, photolithography), and in methods and systems described below, these techniques are augmented with wafer-to-wafer device transfer technologies such as transfer printing, flip chip, etc.

In FIG. 1, a diagram shows wafers 100, 104 that may be used in a process according to an example embodiment. A first set of components 102 (e.g., recording head components) is formed on a first wafer 100 at a first pattern density $\rho 1 \propto D1^{-1}$ (a relatively higher density). A second set of components 106 (e.g., recording head components) is formed on a second wafer 104 at a second pattern density $\rho 2 \propto D2^{-1}$ (e.g., a relatively lower pattern density). In some embodiments, the second pattern density $\rho 2$ is less than half that of the first pattern density $\rho 1$. In other embodiments, $1/10\rho 1 \leq \rho 2 \leq 1/3\rho 1$. Note, that while the density is shown as being proportional to the inverse of the distances D1, D2 between two components on the wafer, other measures may be used to define pattern density, such as a minimum manufacturable feature size.

Figure 2:
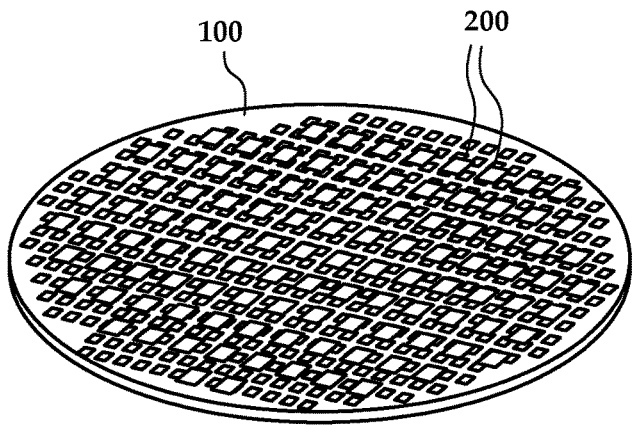

As indicated by the arrow 108 in FIG. 1, the first and second set of components 102, 106 are joined to form respective assemblies or subassemblies. This is seen in FIG. 2, where the components 106 from the second wafer 106 have been moved to the first wafer 100 where they are overlaid onto the first components 102 to form assemblies/subassemblies 200. These subassemblies on wafer 100 can be subject to further processing, such as additional etching to finely align the components, adding of conductors (e.g., wire bonding), dicing into individual parts (e.g., heads), removal of flip chip substrates through etching or planarization, etc.

There are many possible variations on the process shown in FIGS. 1 and 2. For example, the components 102 from the first wafer 100 may alternatively be moved to the second wafer 104, where they are overlaid on second components 106. Similar post-assembly processes may be performed on wafer 104 as described above. While the wafers 100, 104 are shown as being similar in size, one of the wafers 100, 104 may be substantially smaller than the other such that components from the smaller wafer are obtained from multiple wafers and placed onto a single, larger wafer.

The process shown in FIGS. 1 and 2 can be performed using more than two wafers, e.g., transferring component sets from two or more wafers to a target wafer where the subassemblies/assemblies are formed. In such a configuration, more than two different pattern densities may be used for the three or more wafers. Multiple transfer technologies can be used, e.g., transfer printing a first set of components over target components of a target wafer and flip-chip bonding a second set of components over the first components.

Figure 3:
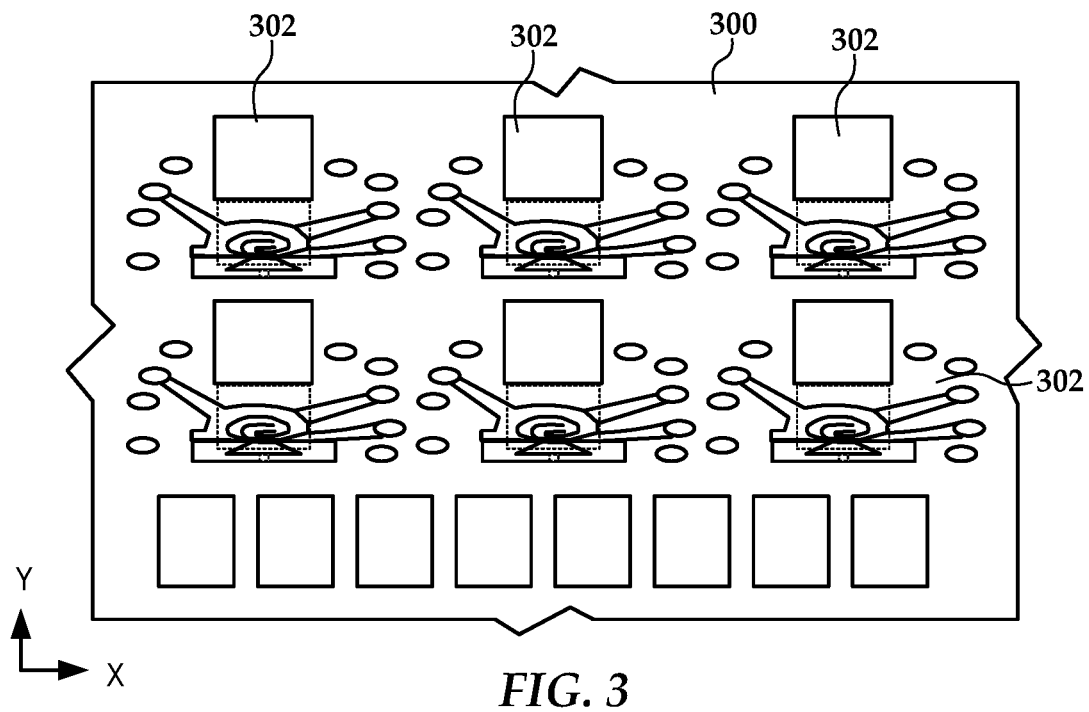
FIGS. 3 and 4 are diagrams of source at target wafers according to an example embodiment.
Figure 4:
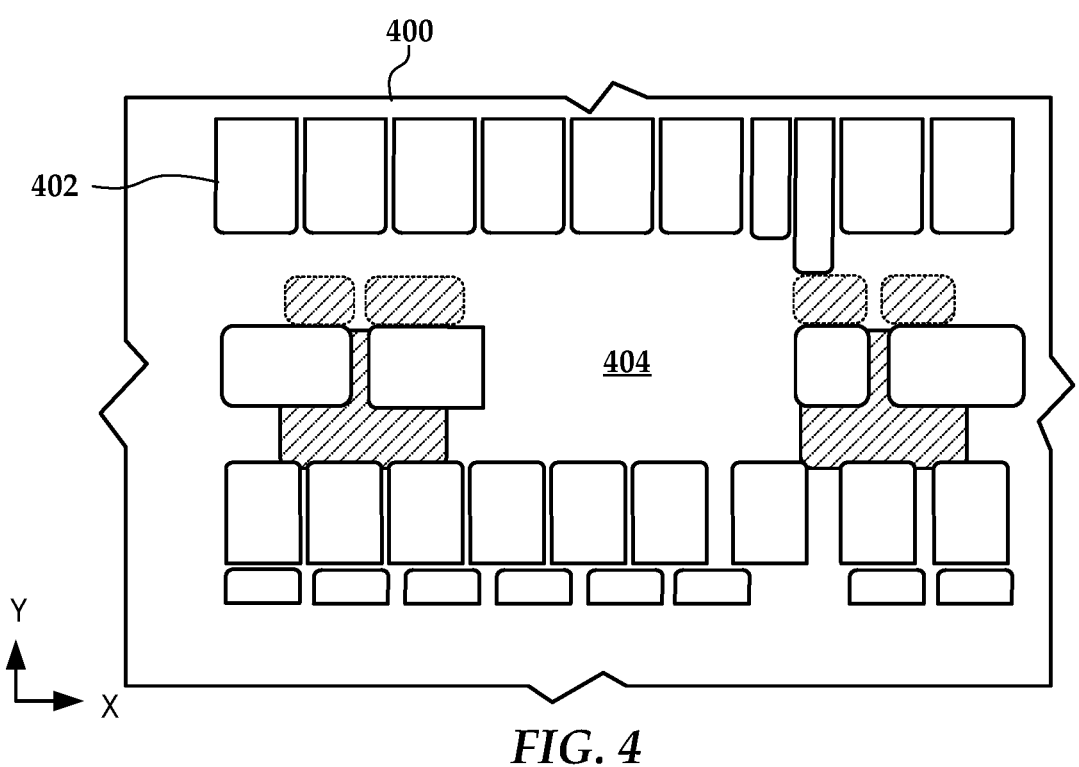
Figure 5:
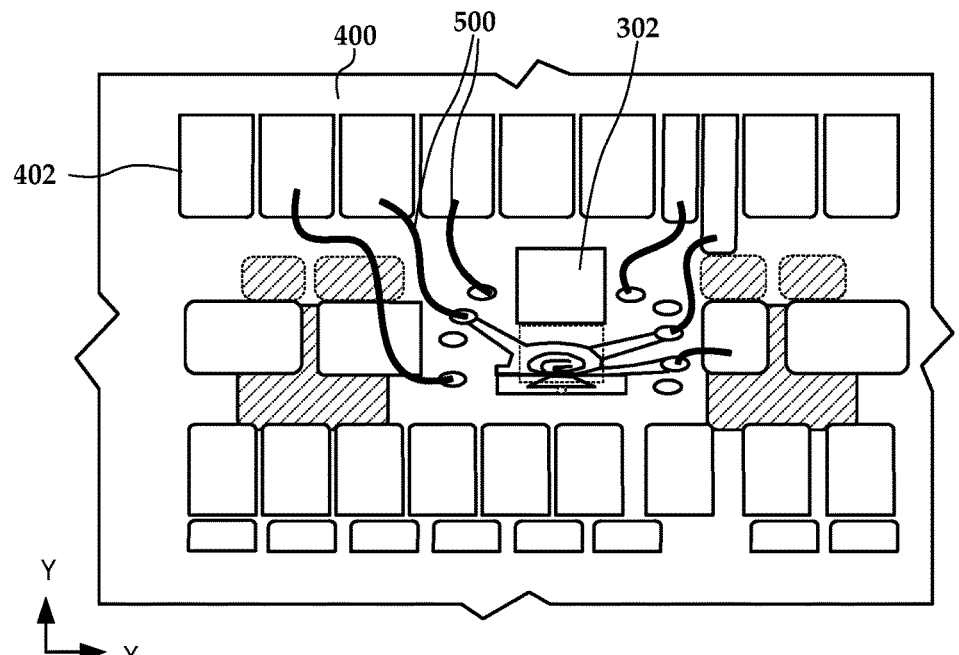
FIG. 5 is a diagram showing assembly of components from the wafers of FIGS. 3 and 4.

Generally, the process shown in FIGS. 1 and 2 can, in some embodiments, enable 4-5× wafer output with same wafer factory footprint and capital cost. In FIGS. 3, 4, and 5, diagrams illustrate an assembly process according to another example embodiment. Shown in FIG. 3 is a portion of a first wafer 300 onto which are formed a first set of recording head components 302 at a first pattern density. Each set of components 302 may be used to form a single recording head. The recording head components 302 may include complex content such as read and write transducers, integrated optics (e.g., waveguides, near-field transducers), sensors, spin-torque oscillators, metrology features, etc.

The wafer 300 may be on the order of 200 mm in size and include on the order of 400k-600k separate recording head components 302. The recording head components 302 may be formed a using between 2000-3000 operational moves. The recording head components may be between 50 μm and 200 μm in size (e.g., height and width). The recording head components 302 may be at least partially tested on the wafer 300 in some embodiments.

In FIG. 4, a portion of a second wafer 400 is shown, onto which are formed a second set of recording head components 402 at a second pattern density. The second pattern density less than half that of the first pattern density. The recording head components 402 may include simple content such as leads, pads, interconnects, heat sinks, etc. The wafer 400 may be on the order of 200 mm in size and include on the order of 100k separate recording head components 402. The recording head components 302 may be formed using between 50-200 operational moves. The smaller recording head components 402 may be similar in size to larger components 302 in FIG. 3, but may require less detail in their formation.

Also note that there is a difference in pitch between the components 302, 402 on wafers 300, 400. Region 404 on wafer 400 is designated to receive one of the components 302, which would be transferred separately from immediate neighbors on the wafer 300. The result of the transfer of one component 302 to wafer 400 is shown in FIG. 5. After the components 302 has been aligned at attached to wafer 400, it may be electrically coupled via conductors 500, e.g., using a wire bonding process or a second transfer printing process. Note that other operations may be performed before or after attachment of the conductors 500, e.g., etching, coating, laser trimming, etc. The read/write heads can be diced from wafer 400 after wafer processing is complete.

Figure 6:
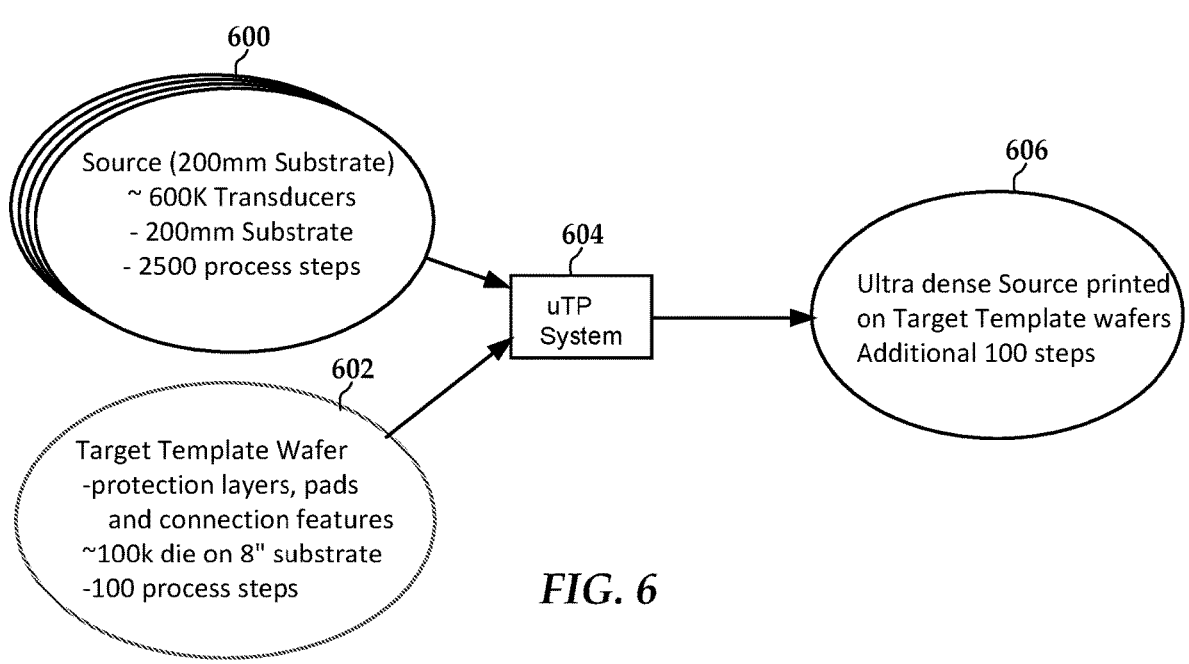
FIG. 6 is a flow diagram of a process according to an example embodiment.

In FIG. 6, a diagram illustrates a process according to an example embodiment. In this example, transducers from multiple source wafers 600 are combined with die components on a target template wafer 602 via a micro-transfer process 604. In one example, between 4 and 10 source wafers 600 may populate each target wafer 602. Note that the numeric values shown in FIG. 6 are for purposes of illustration and not of limitation.

Figure 7:
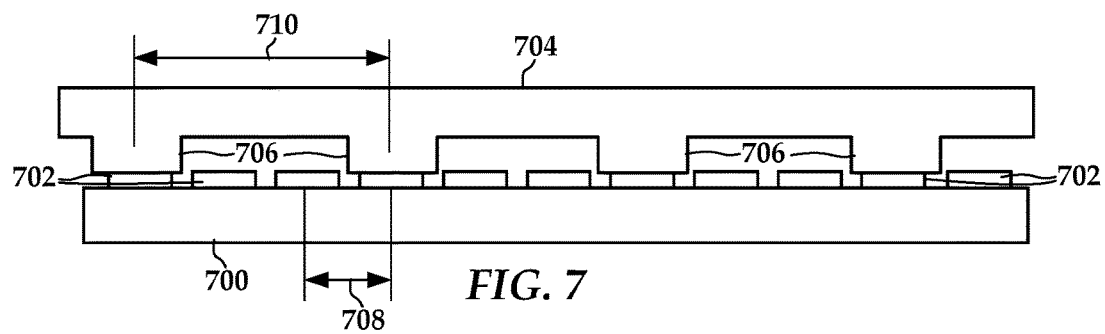
FIGS. 7-10 are diagrams showing a manufacturing process according to another example embodiment
Figure 8:
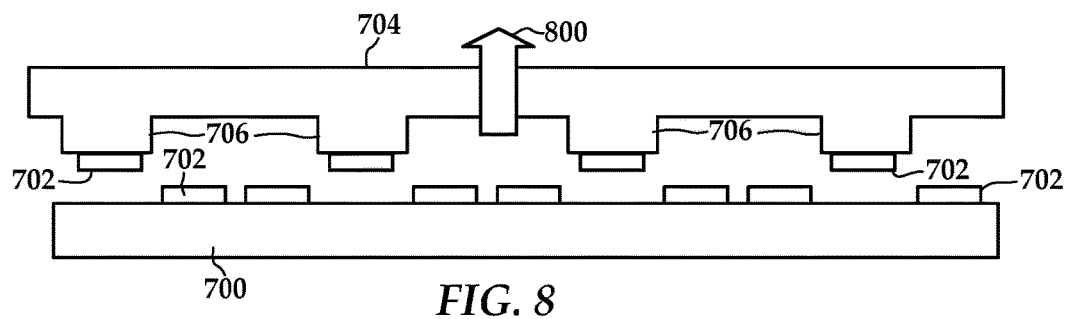

In FIGS. 7-10, diagrams show an example of how source components with source components with relatively small part-to-part separations can be transferred to target wafer components with relatively large part-to-part separations. In FIG. 7, source components 702 (e.g., transducers for read/write heads) are shown on a source wafer 700. The components 702 are formed at a nominal, center-to-center pitch 708. A micro transfer element 704 has protrusions 706 that are spaced at a pitch 710 that is larger than the component pitch 708, e.g., three times as large per side in this example. This results in the protrusions 706 picking up every third component 702 in the left-right direction, as seen in FIG. 8. In two dimensions (as seen from the wafer plane), this would result in picking up one component out of nine. The protrusions 706 will adhere to the components 702 after contact, after which the transfer element 704 is moved away as indicated by arrow 800 in FIG. 8, taking the subset of components 702 with it.

Figure 9:
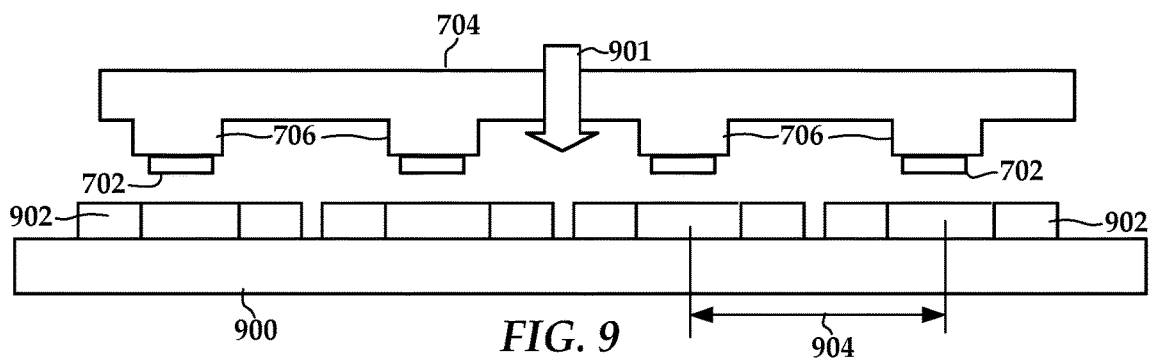
Figure 10:
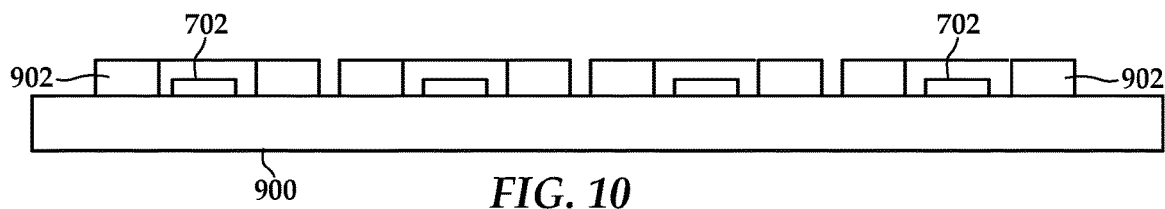

As seen in FIG. 9, the transfer element 704 is moved towards a target substrate 900 as indicated by arrow 901. Components 902 (e.g., leads, pads) are formed on the target substrate 900 at a pitch 904 that matches that of the protrusions of the transfer element 704. The transfer element 704 moves the source components 702 onto the substrate 900 and separated from the transfer element 704 so that the source components 702 are positioned within target components 902 and attached to the target substrate 900 as seen in FIG. 10. In some embodiments, the source components 702 may overlap and be attached to some portions of the target components 902.

Figure 11:
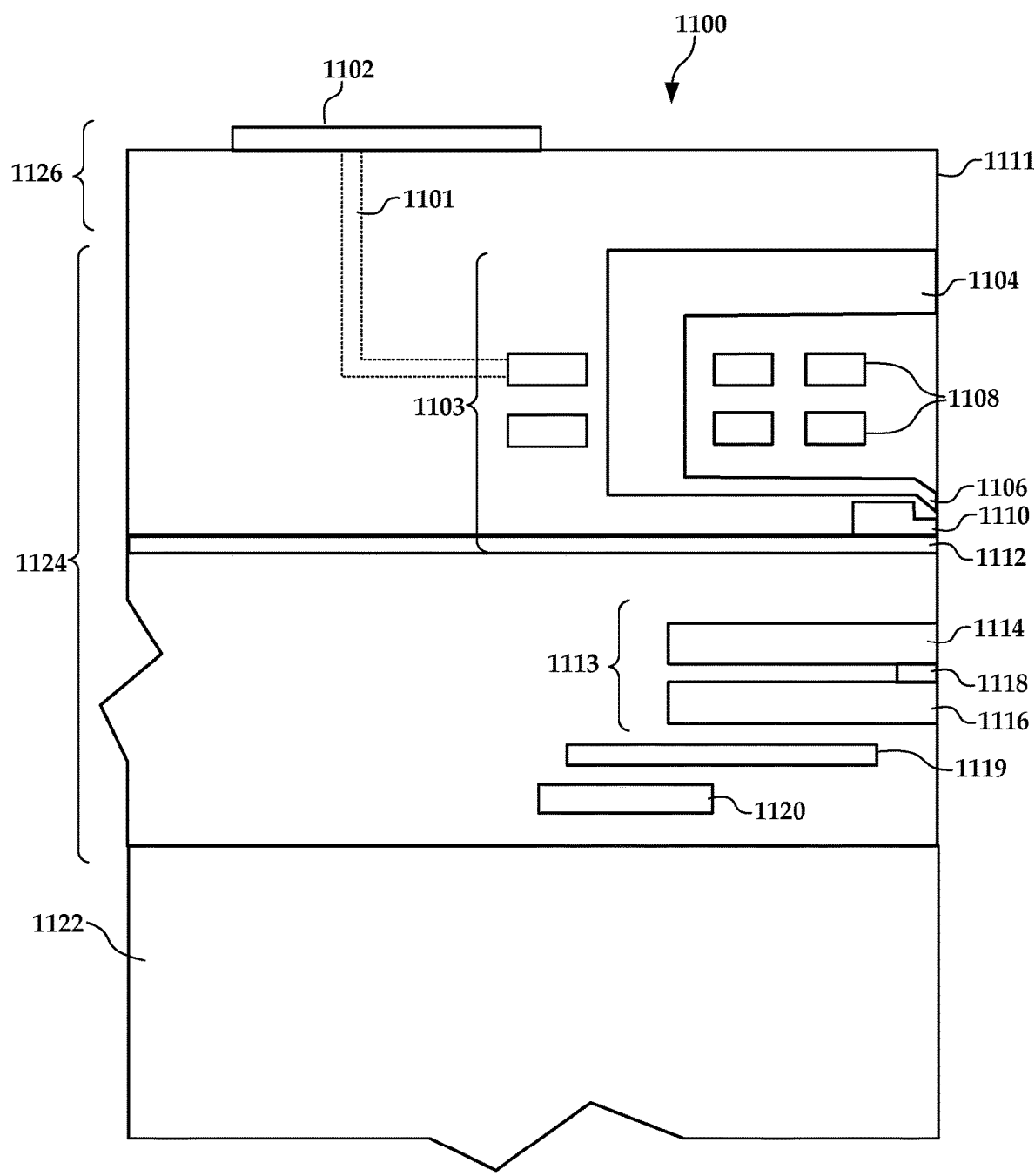
FIG. 11 is a cross-sectional of a read/write-head according to an example embodiment.

The transfer printing techniques described above may be used for a variety of recording head components. In FIG. 11, a cross-sectional diagram illustrates a read/write head 1100 formed using processes according to example embodiments. A read/write head 1100 is formed using a combination of wafer fabrication and transfer printing processes. The read/write head 1100 may include one or more surface-located bond pads 1102 that facilitate electrical communication with components that are integral the read/write head 1100. The read/write head 1100 may include internal conductors 1101 (e.g., studs, traces) that couple the bond pads 1102 to these internal components.

A write transducer 1103 of the read/write head includes a return pole 1104 and write pole 1106 that are magnetically activated by a coil 1108. In an optional HAMR embodiment, the write transducer also includes an NFT 1110 that shapes and directs surface plasmons out of a media-facing surface 1111 of the read/write head 1100. Optical layers 1112 (e.g., waveguide core and cladding layers) deliver energy to the NFT 1110, the energy originating from a laser or the like (not shown). A read transducer 1113 of the read/write head includes a magnetic sensor 1118 (e.g., magnetoresistive stack) surrounded by magnetic shields 1214, 1216. A heater 1120 is activated to control clearance of the read and/or write transducers 1203, 1213. A push block 1119 facilitates shaping of protrusion caused by the heater 1120. These components are all built on top of a substrate 1122 that forms a slider body of the read/write head 1100.

Note that the read/write head components are shown in FIG. 11 for purposes of illustration, and other components may be include that are not shown, and some of the components (e.g., HAMR optical components) may not be included. Generally, the transducer components in region 1124 may be formed on a first, high-part-density wafer. The components 1124 may be transfer printed to a second, low-part-density target wafer, which may include substrate 1122 as well as components that are coupled to region 1126, which includes external interface pad 1102. The pad 1102, conductor 1101, and surrounding materials in region 1126 may be part of the target wafer and/or may be added after joining the transducers to the target wafer, e.g., using wire bonding, additional transfer printing, additional material deposition, etc.

Figure 12:
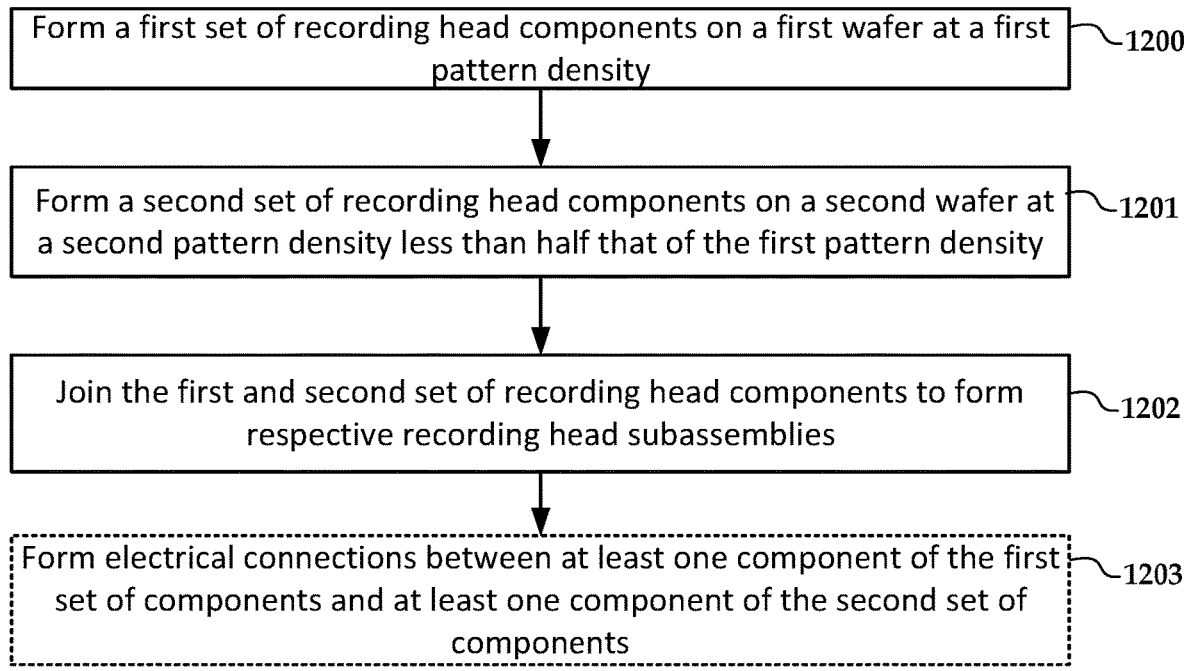
FIG. 12 is a flowchart of a method according to an example embodiment.

In FIG. 12, a flowchart shows a method according to an example embodiment. The method involves forming 1200 a first set of recording head components on a first wafer at a first pattern density. A second set of recording head components is formed 1201 on a second wafer at a second pattern density that is less than half that of the first pattern density. The first and second set of recording head components are joined 1202 (e.g., via transfer printing) to form respective recording head subassemblies. Optionally, after joining the first and second set of recording head components, electrical connections may be formed 1203 between at least one component of the first set of components and at least one component of the second set of components.

Figure 13:
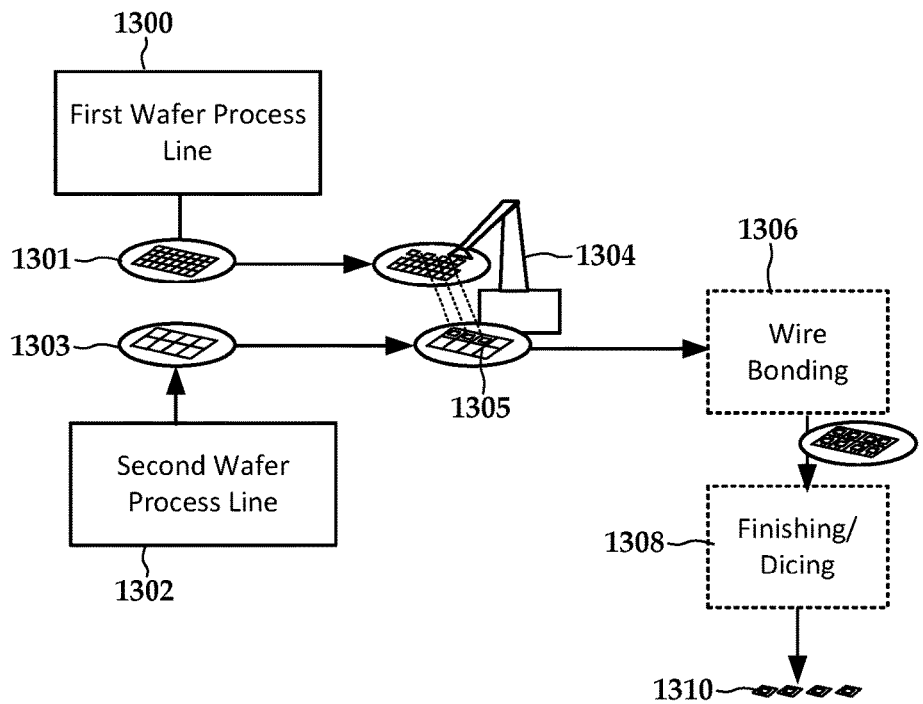
FIG. 13 is a block diagram of a system according to an example embodiment.

In FIG. 13, a block diagram shows a system according to an example embodiment. The system includes a first wafer processing line 1300 configured to form a first set of recording head components on a first wafer 1301 at a first pattern density. The system includes a second wafer processing line 1302 configured to form a second set of recording head components on a second wafer 1303 at a second pattern density that is less than half that of the first pattern density. The system includes a transfer printing apparatus 1304 configured to join the first and second set of recording head components to form respective recording head subassemblies 1305. The system may optionally include a wire bonding apparatus 1306 that forms electrical connections between at least one component of the first set of recording head components and at least one component of the second set of recording head components. The system may also include a finishing/dicing line 1308 that adds additional material to the components and separates them to form individual recording heads 1310.

Note that there may be some challenges related to placement variation in joining wafer components between wafers with different pattern densities. Generally, placement variation of components on the wafer may vary in proportion to pattern density, e.g., wafers with lower pattern density may have higher placement variation in absolute units (e.g., 50-100 nm at the high end of placement variation). Thus the transfer printing process used to join the components may include additional process steps to account for this, e.g., transfer of a subset of components which have a high degree of placement accuracy or which have the same degree and direction of variance. In other embodiments, the design of the components on the wafer can be adapted to reduce the effects of differing placement variation.

In reference again to FIGS. 3-5, note that both wafers 300, 400 have a corresponding xy-coordinate systems associated with major wafer planes on which the components are formed. The components on the higher density wafer 300 may be formed with a higher pattern density in a first direction (e.g., along the x-axis in this example) and a lower pattern density along a different second direction (e.g., the y-axis). This lower pattern density may correspond to the density of the second wafer 400, or may be somewhere in between such that placement variation in the second direction does not significantly reduce yield of the assembled component subassemblies. This anisotropic pattern density may be used for either wafer. Generally, the mechanical and electrical interfaces (e.g., geometry and location of mating features, etc.) between components sets of the two wafers can be designed to take advantage of this anisotropy such that higher placement variations can still ensure alignment between high pattern density components and low pattern density components.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative.

What is claimed is:

1. A method, comprising:
forming a first set of recording head components on a first wafer at a first pattern density;
forming a second set of recording head components on a second wafer at a second pattern density that is less than half that of the first pattern density; and
joining the first and second set of recording head components to form respective recording head subassemblies.

2. The method of claim 1, wherein joining the first and second set of recording head components comprises transfer printing the first set of components onto the second set of components.

3. The method of claim 2, wherein the second set of recording head components are formed at a second part-to-part spacing that is higher than that of the first set of recording head components, and wherein transfer printing the first set of recording head components comprises removing a portion of the first set of recording head components from the first wafer at the second component-to component spacing.

4. The method of claim 2, wherein the first wafer comprises two or more first wafers, wherein the first set of recording head components are transferred from the two or more first wafers to a single one of the second wafer.

5. The method of claim 1, further comprising, after joining the first and second set of recording head components, forming electrical connections between at least one component of the first set of recording head components and at least one component of the second set of recording head components.

6. The method of claim 1, wherein the first set of recording head components comprise optical components.

7. The method of claim 1, wherein the first set of recording head components comprise one or both of read and write transducers.

8. The method of claim 1, wherein the second set of recording head components comprise one or more of interface pads, test pads, and thermal push blocks.

9. The method of claim 1, wherein first components have the first pattern density along a first axis of a major plane of the wafer and a higher pattern density along a second axis of the major plane of the wafer that is different from the first axis.

10. The method of claim 1, wherein the first and second pattern densities are proportional to an inverse of the distances between two components on the first and second wafers.

11. The method of claim 1, wherein the first and second pattern densities are based on a minimum manufacturable feature size of processes used to form the first and second wafers.

12. A method, comprising:
forming a first set of recording head components on a first wafer at a first pattern density and a first part-to-part separation;
forming a second set of recording head components on a second wafer at a second pattern density that is less than half that of the first pattern density and a second part-to-part separation that is greater than the first part-to-part separation;
transfer printing a subset of the first set of recording head components at the second part-to-part separation to the second wafer; and
joining the subset of the first set of recording head components to the second set of recording head components to form respective recording head subassemblies.

13. The method of claim 12, further comprising, after joining the subset of the first set of recording head components to the second set of recording head components, forming electrical connections between at least one component of the first set of recording head components and at least one component of the second set of recording head components.

14. The method of claim 12, wherein the first set of recording head components comprise any combination of optical components, read transducers, and write transducers.

15. The method of claim 12, wherein the second set of recording head components comprise one or more of interface pads, test pads, and thermal push blocks.

* * * * *